US011193435B1

(12) United States Patent
Lusardi

(10) Patent No.: US 11,193,435 B1
(45) Date of Patent: Dec. 7, 2021

(54) SYSTEM AND METHOD OF CONTROLLING A TURBOCHARGED ENGINE

(71) Applicant: Caterpillar Inc., Peoria, IL (US)

(72) Inventor: Christopher Lusardi, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 26 days.

(21) Appl. No.: 16/874,931

(22) Filed: May 15, 2020

(51) Int. Cl.
| | |
|---|---|
| *F02B 37/18* | (2006.01) |
| *F02D 41/00* | (2006.01) |
| *F02M 26/05* | (2016.01) |
| *F02M 26/43* | (2016.01) |

(52) U.S. Cl.
CPC ......... *F02D 41/0007* (2013.01); *F02M 26/05* (2016.02); *F02B 37/18* (2013.01); *F02D 2041/001* (2013.01); *F02D 2200/0406* (2013.01); *F02M 26/43* (2016.02)

(58) Field of Classification Search
CPC ...... F02B 37/18; F02B 37/183; F02B 37/186; F02B 37/002; F02B 37/22; F02D 41/0007; F02D 41/0082
USPC .......................................................... 60/602
See application file for complete search history.

(56) References Cited

U.S. PATENT DOCUMENTS

| | | | |
|---|---|---|---|
| 7,107,761 B2 | 9/2006 | Fukuma et al. | |
| 8,056,337 B2 | 11/2011 | Hokuto et al. | |
| 8,196,403 B2 * | 6/2012 | Hittle ..................... | F02M 26/47 60/602 |
| 9,982,612 B2 | 5/2018 | Geckler | |

FOREIGN PATENT DOCUMENTS

| | | |
|---|---|---|
| CN | 103967591 | 5/2016 |
| EP | 3078825 | 9/2017 |
| JP | 2008025527 | 2/2008 |
| JP | 2008121510 | 5/2008 |

* cited by examiner

*Primary Examiner* — J. Todd Newton, Esq.
(74) *Attorney, Agent, or Firm* — von Briesen & Roper, s.c.

(57) ABSTRACT

A control system for an engine including a turbocharger disposed downstream of a plurality of cylinders. The control system includes an engine sensor configured to generate a signal indicative of an operational characteristic of the engine. The control system includes a first valve configured to control exhaust flow through a first set of cylinders from the plurality of cylinders. The control system includes a second valve configured to control exhaust flow through a second set of cylinders from the plurality of cylinders. The control system includes a controller communicably coupled to the engine sensor, the first valve, and the second valve. The controller is configured to receive the signal generated by the engine sensor. The controller is configured to actuate the first valve and the second valve based on the received signal. The first valve and the second valve are actuated to adjust exhaust flow received by the turbocharger.

20 Claims, 4 Drawing Sheets

SYSTEM AND METHOD OF CONTROLLING A TURBOCHARGED ENGINE

TECHNICAL FIELD

The present disclosure relates to a turbocharged engine. More particularly, the present disclosure relates to a system and a method of controlling a turbocharged engine.

BACKGROUND

Engines, such as a V-type multiple cylinder engine, may include a turbocharger which provides a desired boost in power to the engine. There have been developments which allow the turbocharger to be provided for some banks out of a total number of banks of cylinders of the engine, from efficiency and other considerations. In such cases, when the turbocharger is operating, a control valve in an exhaust pipe may force exhaust gases from the bank on a side with the closed control valve to flow through a communicating pipe and into the exhaust pipe with the turbocharger, where it merges with the exhaust gas from that side. This large amount of exhaust gas drives a turbine in the turbocharger, which in turn drives a compressor that is integrated with the turbine and compresses air. Introducing this compressed air into combustion chambers enables a large pressure boost to be obtained and may suppress thermal degradation of an upstream control catalyst on a side of the exhaust pipe without the turbocharger.

Moreover, in an engine provided with a turbocharger for one bank, depending on the operating state of the engine, the pressure of the exhaust gas upstream of the turbine may become higher than a pressure (boost pressure) of the intake air downstream of the compressor, which increases an amount of residual gases in the combustion chamber and adversely effects combustion. There have also been concerns regarding costs, complexity, and other limitations associated with components such as a wastegate, a variable geometry turbine (VGT) nozzle, among others which find application with conventional turbochargers.

U.S. Pat. No. 8,056,337 describes a plurality of cylinders arranged as divided into left and right first and second banks. An intake pipe, a first exhaust pipe, and a second exhaust pipe are connected to cylinder groups of the banks. A first upstream three-way catalyst and a first control valve are provided in one exhaust pipe while a second upstream three-way catalyst and a second control valve are provided in the other exhaust pipe. The exhaust pipes are communicated together upstream of the upstream three-way catalysts and the control valves by a communicating pipe. A third control valve provided in a communicating pipe adjusts a flowrate of exhaust gas.

The present disclosure is directed to overcome one or more of the shortcomings set forth above and/or other shortcomings of the prior art.

SUMMARY

In an aspect of the present disclosure, a control system for an engine is provided. The engine includes a turbocharger disposed downstream of a plurality of cylinders producing exhaust flow. The plurality of cylinders includes a primary set of cylinders, a first set of cylinders, and a second set of cylinders. The primary set of cylinders is fluidly connected to a primary exhaust conduit section. The first set of cylinders is fluidly connected to a first exhaust conduit section. The second set of cylinders is fluidly connected to a second exhaust conduit section. The control system includes an engine sensor configured to generate a signal indicative of an operational characteristic of the engine. The control system also includes a first valve disposed along the first exhaust conduit section and downstream of the first set of cylinders and upstream of the turbocharger. The first valve is configured to control exhaust flow from the first exhaust conduit section between the turbocharger and a first bypass route through which the exhaust flow from the first set of cylinders bypasses the turbocharger. The control system further includes a second valve disposed along the second exhaust conduit section and downstream of the second set of cylinders and upstream of the turbocharger. The second valve is configured to control exhaust flow from the second exhaust conduit section between the turbocharger and a second bypass route through which the exhaust flow from the second set of cylinders bypasses the turbocharger. The control system includes a controller communicably coupled to the engine sensor, the first valve and the second valve. The controller is configured to receive the signal generated by the engine sensor. The controller is also configured to actuate the first valve based on the received signal. The controller is further configured to actuate the second valve based on the received signal. The first valve and the second valve are actuated to adjust a first amount of exhaust flow received by the turbocharger and a second amount of exhaust flow bypassing the turbocharger.

In another aspect of the present disclosure, an engine is provided. The engine includes a plurality of cylinders. The plurality of cylinders includes a primary set of cylinders, a first set of cylinders, and a second set of cylinders. The engine also includes a turbocharger disposed downstream of the plurality of cylinders. The engine further includes an engine sensor configured to generate a signal indicative of an operational characteristic of the engine. The engine includes a primary exhaust conduit section fluidly connected to and downstream of the primary set of cylinders. The primary exhaust conduit section is fluidly connected to the turbocharger. The engine also includes a first exhaust conduit section fluidly connected to and disposed downstream of the first set of cylinders. The engine further includes a first valve fluidly connected to and disposed downstream of the first exhaust conduit section. The first valve is configured to control exhaust flow from the first exhaust conduit section between the turbocharger and a first bypass route through which the exhaust flow from the first set of cylinders bypasses the turbocharger. The engine also includes a second exhaust conduit section fluidly connected to and disposed downstream of the second set of cylinders. The engine further includes a second valve fluidly connected to and disposed downstream of the second exhaust conduit section. The second valve is configured to control exhaust flow from the second exhaust conduit section between the turbocharger and a second bypass route through which the exhaust flow from the second set of cylinders bypasses the turbocharger. The engine includes a controller communicably coupled to the engine sensor, the first valve, and the second valve. The controller is configured to receive the signal generated by the engine sensor. The controller is configured to actuate the first valve based on the received signal. The controller is configured to actuate the second valve based on the received signal. The first valve and the second valve are actuated to adjust a first amount of exhaust flow received by the turbocharger and a second amount of exhaust flow bypassing the turbocharger.

In yet another aspect of the present disclosure, a method of controlling an engine is provided. The engine includes a turbocharger disposed downstream of a plurality of cylinders producing exhaust flow. The plurality of cylinders includes a primary set of cylinders, a first set of cylinders, and a second set of cylinders. The method includes operating the plurality of cylinders to generate exhaust flow. The method also includes operating the turbocharger with a primary exhaust flow from the primary set of cylinders. The method further includes receiving, by a controller, a signal indicative of an operational characteristic of the engine generated by an engine sensor. The method includes actuating, by the controller, a first valve fluidly connected to and disposed downstream of the first set of cylinders and upstream of the turbocharger based on the received signal. The first valve is configured to control a first exhaust flow from the first set of cylinders between the turbocharger and a first bypass route through which the first exhaust flow bypasses the turbocharger. The method also includes actuating, by the controller, a second valve fluidly connected to and disposed downstream of the second set of cylinders and upstream of the turbocharger based on the received signal. The second valve is configured to control a second exhaust flow from the second set of cylinders between the turbocharger and a second bypass route through which the second exhaust flow bypasses the turbocharger.

DETAILED DESCRIPTION

Figure 1:
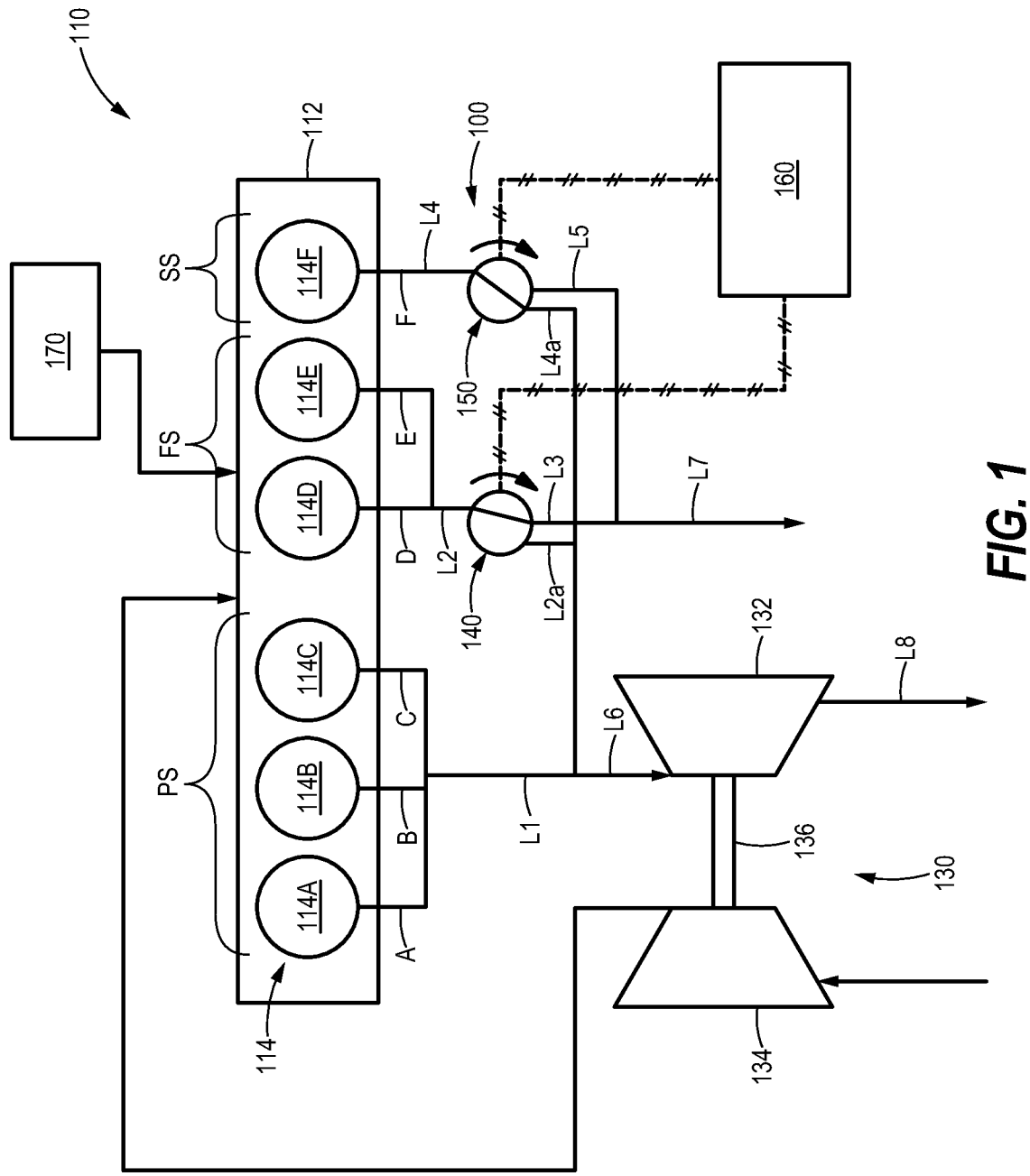
FIG. 1 is a schematic illustration of an engine and a control system associated with the engine, in accordance with the concepts of the present disclosure.

Wherever possible, the same reference numbers will be used throughout the drawings to refer to same or like parts. FIG. 1 illustrates an exemplary combustion engine 110. For the purposes of this disclosure, the engine 110 will be described as a four-stroke gaseous-fueled engine, for example a natural gas engine. One skilled in the art will recognize, however, that the engine 110 may be any other type of combustion engine such as, for example, a diesel, a gasoline, or a dual-fuel engine. The engine 110 includes a number of cylinders 114A to 114F. As illustrated, the engine 110 includes an engine block 112 that defines the number of cylinders 114A to 114F.

The number of cylinders, generally 114 includes a primary set of cylinders PS, a first set of cylinders FS, and a second set of cylinders SS. A piston (not shown) may be slidably disposed within each cylinder 114A to 114F to reciprocate between a top-dead-center (TDC) position and a bottom-dead-center (BDC) position, and a cylinder head (not shown) is associated with each cylinder 114A to 114F. Each combination of cylinder 114A to 114F and piston, together with the cylinder head defines a combustion chamber. It is contemplated that the engine 110 includes any number of combustion chambers and the combustion chambers may be disposed in an "in-line" configuration, a "V" configuration, or in any other suitable configuration.

In an embodiment, the engine 110 may be a four-stroke engine such that each piston may reciprocate between the TDC and BDC positions through an intake stroke, a compression stroke, a combustion or power stroke, and an exhaust stroke. It may also be contemplated that the engine 110 may alternatively be a two-stroke engine, wherein a complete cycle includes a compression/exhaust stroke (BDC to TDC) and a power/exhaust/intake stroke (TDC to BDC).

As illustrated in FIG. 1, the engine 110 has a turbocharger 130 disposed downstream of the number of cylinders 114A to 114F producing exhaust flow (represented by lines A to F in the accompanying figure). The turbocharger 130 includes a turbine 132 and a compressor 134, which are operatively coupled to each other through a shaft 136. The exhaust flow is directed into the turbine 132, which in turn directs the exhaust flow into the atmosphere via a line L8, and the compressor 134 ingests fresh air from the atmosphere. The turbocharger 130 transfers energy from an exhaust stream of the turbine 132 to an intake stream of the compressor 134, via the shaft 136.

In the illustrated embodiment, the primary set of cylinders PS includes the cylinders 114A, 114B, 114C. The primary set of cylinders PS is fluidly connected to a primary exhaust conduit section L1. More specifically, the lines A, B, C carrying exhaust flow from the primary set of cylinders PS merge together to form the primary exhaust conduit section L1. The first set of cylinders FS includes the cylinders 114D, 114E. The first set of cylinders FS is fluidly connected to a first exhaust conduit section L2. More specifically, the lines D, E carrying exhaust flow from the first set of cylinders FS merge together to form the first exhaust conduit section L2. Further, the second set of cylinders SS includes the cylinder 114F. The second set of cylinders SS is fluidly connected to a second exhaust conduit section L4. More specifically, the line F carrying exhaust flow from the second set of cylinders SS is fluidly connected to the second exhaust conduit section L4. In the illustrated embodiment, the second set of cylinders SS includes a single cylinder 114F. However, the second set of cylinders SS may include more than one cylinder 114.

The engine 110 further includes a control system 100. The control system 100 includes an engine sensor 120 (shown in FIG. 3). The engine sensor 120 generates a signal indicative of an operational characteristic of the engine 110. The operational characteristic of the engine 110 may be selected from an exhaust flow pressure, an exhaust flow temperature, an exhaust flow rate, intake flow pressure, intake flow temperature, intake flow rate, or in-cylinder pressure. The operational characteristic may include any other operating variable of the engine 110, without any limitations.

The control system 100 includes a first valve 140 along the first exhaust conduit section L2. The first valve 140 is located downstream of the first set of cylinders FS and upstream of the turbocharger 130. The first valve 140 controls exhaust flow from the first exhaust conduit section L2 between a second leg L2a of the first exhaust conduit section L2 which leads to the turbocharger 130 and a first bypass route L3 through which the exhaust flow from the first set of cylinders FS (herein cylinders 114D, 114E) bypasses the turbocharger 130. The first valve 140 is movable between a first position at which the exhaust flow from the first exhaust conduit section L2 is directed only to the turbocharger 130 and a second position at which the exhaust flow from the first exhaust conduit section L2 is directed only to bypass the turbocharger 130.

More specifically, the first valve 140 is movable between the first position and the second position to direct the exhaust flow from the lines D, E of the first set of cylinders SS after the exhaust flow passes through the first exhaust conduit section L2. In the first position, the exhaust flow passes through the first valve 140 and is directed along the second leg L2a of the first exhaust conduit section L2 towards a line L6. In the second position, the exhaust flow passes through the first valve 140 and is directed along the first bypass route L3 and then to a line L7. In some embodiments, the first valve 140 may include intermediate positions between the first and second positions in which the exhaust flow may be divided between the second leg L2a of the first exhaust conduit section L2 and the first bypass route L3. When the first valve 140 is closer to the first position, greater exhaust flow passes through the second leg L2a of the first exhaust conduit section L2 compared to the exhaust flow passing through the first bypass route L3. Similarly, when the first valve 140 is closer to the second position, greater exhaust flow passes through the first bypass route L3 compared to the second leg L2a of the first exhaust conduit section L2.

As illustrated in FIG. 1, the first valve 140 controls exhaust flow from the first set of cylinders FS (herein two cylinders 114D, 114E) of the six cylinders 114A to 114F. At all times, exhaust flow from the primary set of cylinders PS i.e. 114A, 114B, 114C passes through the lines A, B, C respectively and merges into the primary exhaust conduit section L1. When the first valve 140 is in the first position, exhaust flow from the cylinders 114D, 114E is directed through the second leg L2a of the first exhaust conduit section L2 and combines with the exhaust flow in the primary exhaust conduit section L1. When the first valve 140 is in the second position, the exhaust flow from the cylinders 114D, 114E is directed through the first bypass route L3 and combines with the exhaust flow in a second bypass route L5.

The control system 100 includes a second valve 150 along the second exhaust conduit section L4. The second valve 150 is located downstream of the second set of cylinders SS and upstream of the turbocharger 130. As illustrated in FIG. 1, the second valve 150 controls exhaust flow from the second set of cylinders SS i.e. the cylinder 114F of the number of cylinders 114. More specifically, the second valve 150 controls exhaust flow from the second exhaust conduit section L4 between a second leg L4a of the second exhaust conduit section L4 which leads to the turbocharger 130 and the second bypass route L5 through which the exhaust flow from the second set of cylinders SS (herein cylinder 114F) bypasses the turbocharger 130. The second valve 150 is movable between a first position at which exhaust flow from the second exhaust conduit section L4 is directed only to the turbocharger 130 and a second position at which exhaust flow from the second exhaust conduit section L4 is directed only to bypass the turbocharger 130.

More specifically, the second valve 150 is movable between the first position and the second position to direct the exhaust flow from the line F of the cylinder 114F after the exhaust flow passes through the second exhaust conduit section L4. In the first position, the exhaust flow passes through the second valve 150 and is directed along the second leg L4a of the second exhaust conduit section L4 and then to the line L6. In the second position, the exhaust flow passes through the second valve 150 and is directed along the second bypass route L5 towards the line L7. In some embodiments, the second valve 150 may include intermediate positions between the first position and the second position in which the exhaust flow may be divided between the second leg L4a of the second exhaust conduit section L4 and the second bypass route L5. When the second valve 150 is closer to the first position, greater exhaust flow passes to the second leg L4a of the second exhaust conduit section L4 compared to the exhaust flow passing through the second bypass route L5. Similarly, when the second valve 150 is closer to the second position, greater exhaust flow passes to the second bypass route L5 compared to the exhaust flow passing through the second leg L4a of the second exhaust conduit section L4.

This way the control system 100 of the present figure provides a "variable geometry" concept in accordance with the implementation of the engine 110. The "variable geometry" may find applications where there is a need to control the number of active cylinder(s) 114 that direct exhaust flow towards the turbocharger 130 such that the exhaust flow supplied to the turbocharger 130 may be controlled or varied dynamically as per factors such as efficiency, power mode, run-time engine requirements, among others.

Operation of the engine 110 will be apparent from the following table that depicts the number of cylinders 114 of the engine 110 which feed the turbine 132 of the turbocharger 130 based upon the position of the first valve 140 and the second valve 150:

| Position of first valve 140 | Position of second valve 150 | Number of cylinders 114 feeding turbine 132 |
|---|---|---|
| Second Position | Second Position | 3 |
| Second Position | First Position | 4 |
| First Position | Second Position | 5 |
| First Position | First Position | 6 |

As will be evident, positioning the first valve 140 in the second position (i.e., bypassing the turbocharger 130), permits three or four cylinders 114 to feed the turbocharger 130, depending on the position of the second valve 150. Further, positioning the second valve 150 in the second position (i.e., bypassing the turbocharger 130), permits three or five cylinders 114 to feed the turbocharger 130, depending on the position of the first valve 140. Positioning both the first valve 140 and the second valve 150 at respective first positions permits six cylinders 114 to feed the turbocharger 130.

As stated above, in an embodiment, the exhaust flow may be divided by the first valve 140 and the second valve 150 when the first valve 140 and the second valve 150 are between the respective first and second positions so that the turbocharger 130 may receive exhaust flow from fractions of the cylinders 114A to 114F as compared to whole numbers. In other words, in such cases, the amount of exhaust flow directed to the turbocharger 130 and bypassing the turbocharger 130 may be highly adjustable. As an example, positioning the first valve 140 in the respective second position and the second valve 150 between respective first and second positions may permit the turbocharger 130 to receive exhaust flow from more than 3 cylinders 114 and less than 4 cylinders 114. It should be contemplated that various other such combinations may also be envisioned well within the scope of the preset disclosure.

Referring to the table above, in all scenarios, exhaust flow from the primary set of cylinders PS i.e. 114A, 114B, 114C passes along the primary exhaust conduit section L1 to the line L6 to constantly drive the turbocharger 130 regardless of the positions of the first and second valves 140, 150.

If the first valve 140 is in the first position, the exhaust flow from the first set of cylinders FS passes along the first exhaust conduit section L2, through the first valve 140, through the second leg L2a of the first exhaust conduit section L2, and to the line L6 to drive the turbocharger 130. Additionally, if the second valve 150 is in the first position, the exhaust flow from the second set of cylinders SS will pass along the second exhaust conduit section L4, through the second valve 150, through the second leg L4a of the second exhaust conduit section L4, and to the line L6 to drive the turbocharger 130. Such a configuration will result in all six cylinders 114 driving the turbocharger 130. If the second valve 150 is in the second position, the exhaust flow from the second set of cylinders SS will pass along the second exhaust conduit section L4, through the second valve 150, through the second bypass route L5, and to the line L7 to bypass the turbocharger 130. Such a configuration will result in five cylinders 114 driving the turbocharger 130 (i.e., all except the cylinder 114F).

Similarly, if the first valve 140 is in the second position, the exhaust flow from the first set of cylinders FS passes along the first exhaust conduit section L2, through the first valve 140, through the first bypass route L3, and to the line L7 to bypass the turbocharger 130.

If the second valve 150 is in the first position, the exhaust flow from the second set of cylinders SS passes along the second exhaust conduit section L4, through the second valve 150, through the second leg L4a of the second exhaust conduit section L4, and to the line L6 to drive the turbocharger 130 in addition to the primary set of cylinders PS, provided that the first valve 140 is in the second position. Such a configuration will result in four cylinders 114 driving the turbocharger 130 (i.e., all except cylinders 114D, 114E). If the second valve 150 is in the second position, the exhaust flow from the second set of cylinders SS passes along the second exhaust conduit section L4, through the second valve 150, through the second bypass route L5, and to the line L7 to bypass the turbocharger 130. Such a configuration will result in three cylinders 114 driving the turbocharger 130 (i.e., only the primary set of cylinders PS), provided the first valve 140 is in the second position.

In some embodiments, the engine 110 combusts tail gas from a Solid Oxide Fuel Cell (SOFC) 170, or any other source as used or known in the art. The SOFC 170 may intake a hydrogen rich mixture along with air through respective fuel and air intakes of the SOFC 170. Further, the SOFC 170 may ionize oxygen in the air such that the ionized oxygen migrates to a fuel side of the SOFC 170 where the ionized oxygen reacts with the mixture to produce a SOFC effluent (also referred to as "tail gas" as will be evident to a person having knowledge in the art), which may be directed back to the engine 110 as illustrated in the present figure. The tail gas may include a high percentage of inert gases such as $CO_2$ and thereby a high ratio of the tail gas to the air may be required to achieve desired combustible mixture. Moreover, the turbocharger 130 may need similar flow rates for the compressor 134 and the turbine 132, and this may require some exhaust flow to be "bypassed" around the turbine 132. In some cases, the turbocharger 130 may need the boost pressure to be varied to be matched with a pressure of the tail gas. The "bypassed" exhaust flow is illustrated along the line L7 in FIG. 1.

The present disclosure allows channeling of exhaust flow from a subset (i.e. three or more cylinders 114A to 114F in the present figure) out of the number of cylinders 114 to be supplied to the turbine 132 of the turbocharger 130. The present disclosure allows exhaust flow from the first set of cylinders FS and the second set of cylinders SS to be varied or even completely bypassed as per the application requirements. The number of cylinders 114D, 114E, 114F not supplying exhaust flow to the turbine 132 may be varied based upon the state of the first valve 140 and the second valve 150.

As illustrated in FIG. 1, a number of cylinders 114D, 114E included in the first set of cylinders FS (herein two cylinders i.e. 114D, 114E) is different than a number of cylinders 114F included in the second set of cylinders SS (herein one cylinder i.e. 114F). Further, operation of the first valve 140 and the second valve 150 allows a desired amount of the exhaust flow to be supplied to the turbine 132 as per the running requirement of the engine 110, or a vehicle in which the engine 110 is positioned. In some embodiments, exhaust flow from at least a pre-determined number of cylinders (such as the primary set of cylinders PS shown in FIG. 1) from the number of cylinders 114 is always supplied to the turbocharger 130.

Figure 2:
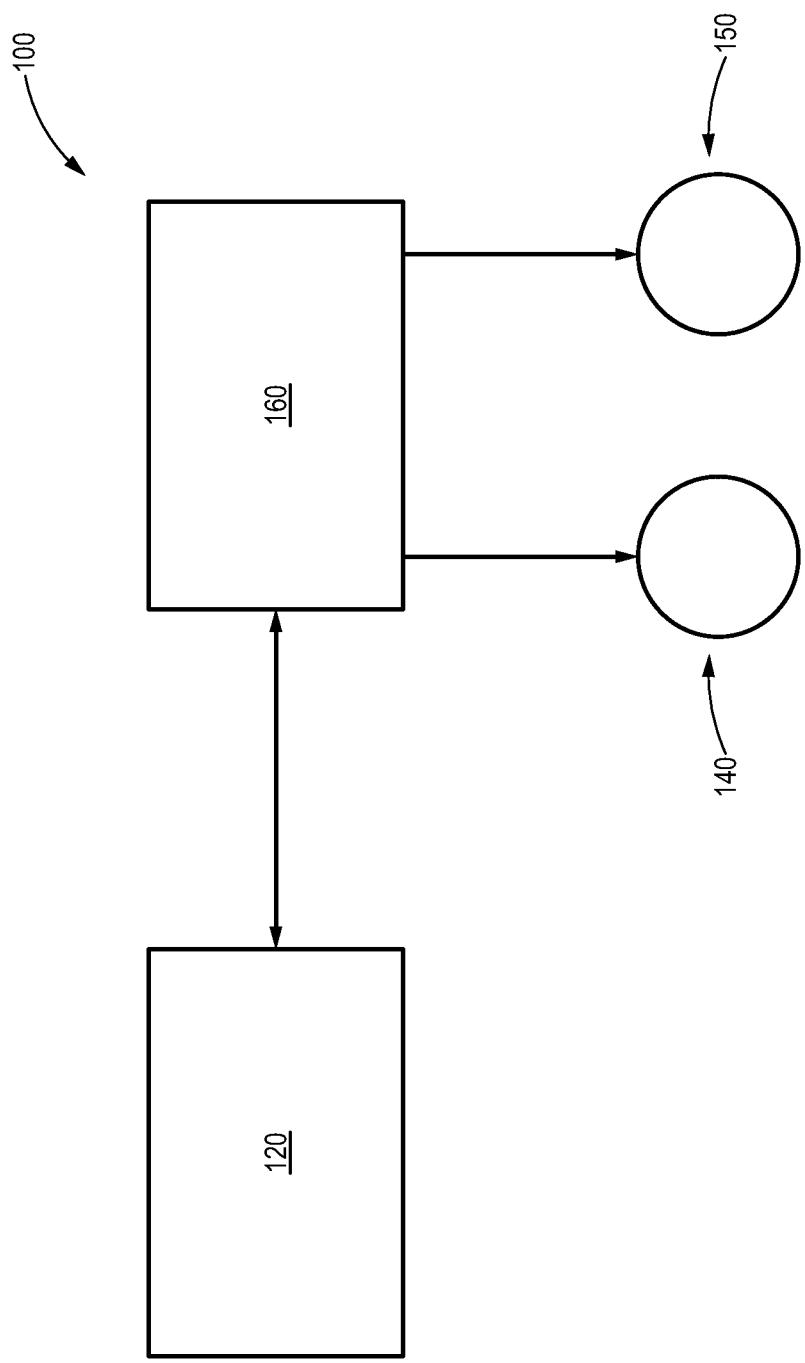
FIG. 2 is a schematic illustration of the control system of FIG. 1 having a controller, in accordance with the concepts of the present disclosure.

FIG. 2 illustrates the control system 100 having a controller 160 communicably coupled to the engine sensor 120, the first valve 140, and the second valve 150. The controller 160 may be any electronic controller, engine control unit, machine control unit, or a computing system. The controller 160 may include a processor which operates to perform operations, executes control algorithms, stores data, retrieves data, gathers data, and/or performs any other computing or controlling task desired.

The controller 160 may be a single controller or may include more than one controllers to control various functions and/or features of the engine 110. The controller 160 includes an associated memory. The controller 160 may be otherwise connected to an external memory, such as a database or server. The associated memory and/or external memory may include, but are not limited to including, a Read Only Memory (ROM), a Random Access Memory (RAM), a portable memory, and the like.

The controller 160 receives the signal generated by the engine sensor 120. The controller 160 operates the first valve 140 and the second valve 150 based on the received signal. The first valve 140 and the second valve 150 are positioned to adjust a first amount of exhaust flow received by the turbocharger 130 and a second amount of exhaust flow that bypasses the turbocharger 130. The first amount of exhaust flow may be defined as volume of the exhaust flow through various cylinders 114 based on position of the first valve 140 and the second valve 150 which is received by the turbine 132 of the turbocharger 130. Further, the second amount of exhaust flow may be defined as volume of the exhaust flow through various cylinders 114 based on position of the first valve 140 and the second valve 150 which bypasses the turbocharger 130.

In some embodiments, the controller 160 may take into account any functional variable of the engine 110 to operate the first valve 140 and the second valve 150. In an embodiment, the controller 160 may consider the feedback or the signal received from the engine sensor 120. The engine sensor 120 may generate the signal indicative of the operational characteristic of the engine 110. Further, the operational characteristic of the engine 110 may be selected from the exhaust flow pressure, the exhaust flow temperature, the exhaust flow rate, the intake flow pressure, the intake flow temperature, the intake flow rate, or the in-cylinder pressure. The operational characteristic may include any other operating variable of the engine 110, without any limitations.

Figure 3:
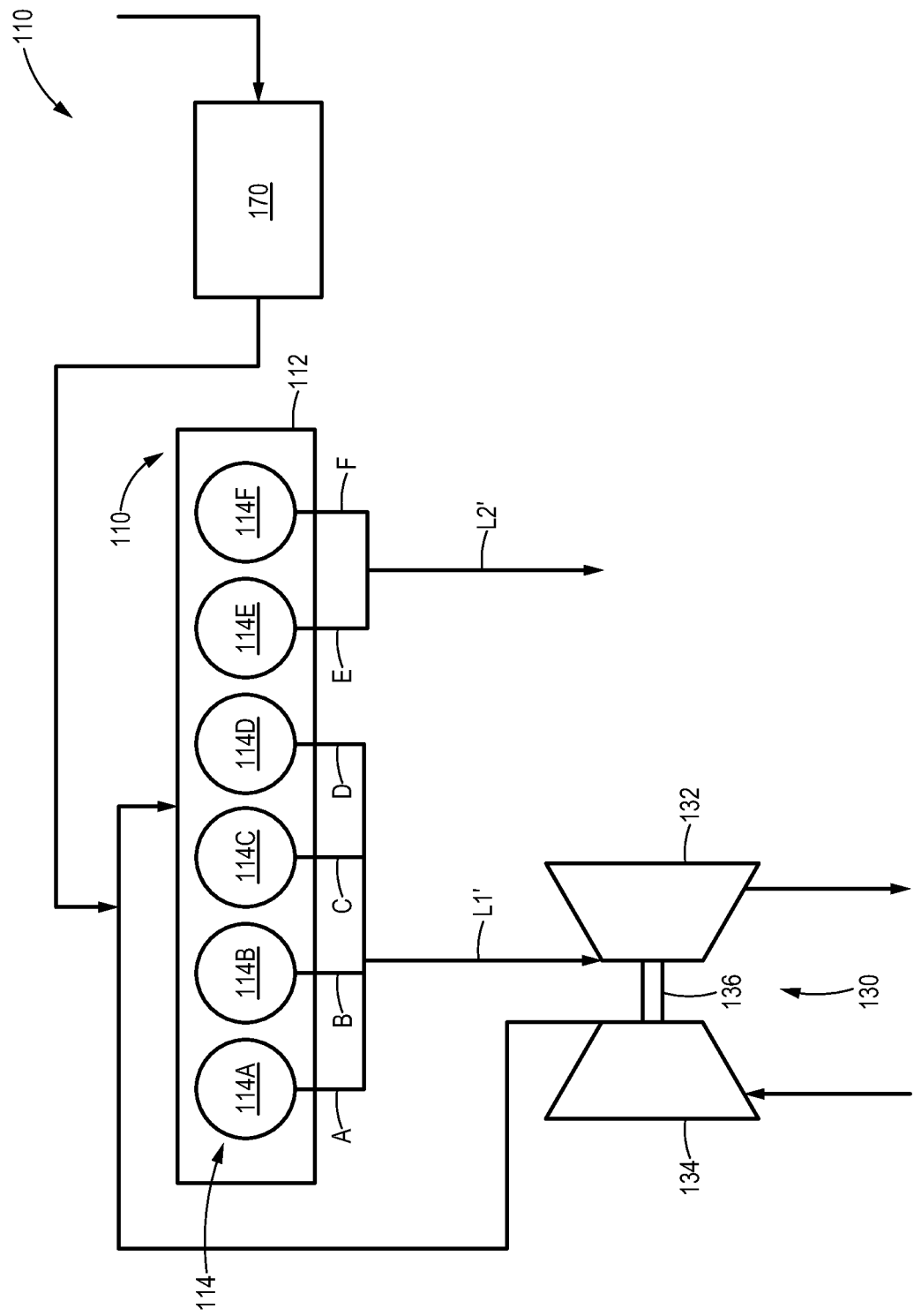
FIG. 3 is a schematic illustration of the engine of FIG. 1, in accordance with the concepts of the present disclosure.

FIG. 3 illustrates a different configuration of the control system 100 for the engine 110. In FIG. 2, the engine 110 includes the number of cylinders 114 which are divided into two fixed sets i.e. a first set of cylinders 114A, 114B, 114C, 114D and a second set of cylinders i.e. 114E, 114F. Through such a configuration, a "fixed geometry" concept is provided. The "fixed geometry" may find applications where the exhaust flow from the total number of the cylinders 114 substantially exceeds the desired exhaust flow through the turbine 132 of the turbocharger 130. In such cases, it may be desirable to fix the number of active cylinder(s) contributing exhaust flow to the turbocharger 130 such that the exhaust flow supplied to the turbocharger 130 may be reduced based upon run-time engine requirements, efficiency, and power, among other factors. The engine 110 includes the turbocharger 130 disposed downstream of the first set of cylinders 114A, 114B, 114C, 114D. This will allow exhaust flow along the lines A, B, C, D from only the first set of cylinders 114A, 114B, 114C, 114D to be supplied to the turbocharger 130 along a line L1'. The turbocharger 130, in turn, delivers the combined exhaust flow from the lines A, B, C, D received from the first set of cylinders 114A, 114B, 114C, 114D to the atmosphere.

In the present figure, exhaust flow from the lines E, F from the cylinders 114E, 114F is made to bypass the turbine 132 of the turbocharger 130, and instead the exhaust flow from the lines E, F moves to a line L2'. This may be in accordance with different factors associated with the engine 110 such as power, efficiency, or other operating considerations of the engine 110.

INDUSTRIAL APPLICABILITY

Figure 4:
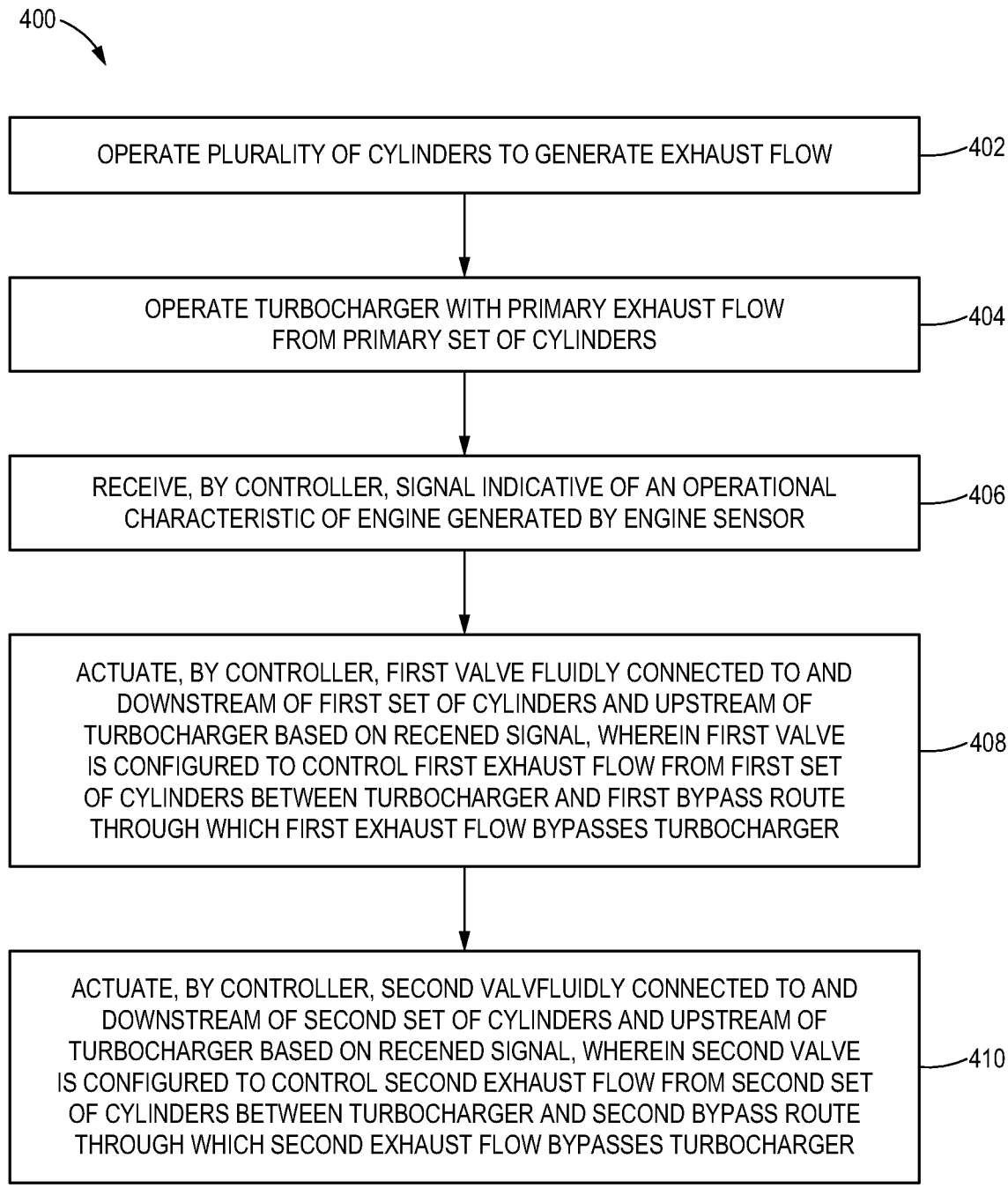
FIG. 4 is a flowchart of a method of controlling the engine, in accordance with the concepts of the present disclosure.

The present disclosure relates to the control system 100 and a method 400. FIG. 4 illustrates a flowchart for the method 400 of controlling the engine 100. The engine 110 includes the turbocharger 130 disposed downstream of the number of cylinders 114 producing exhaust flow. At step 402, the number of cylinders 114 are operated to generate the exhaust flow. At step 404, the turbocharger 130 is operated with a primary exhaust flow from the primary set of cylinders PS. The primary exhaust flow may be defined as a volume of exhaust flow produced by the primary set of cylinders PS. At step 406, the controller 160 receives the signal indicative of the operational characteristic of the engine 110 generated by the engine sensor 120.

At step 408, the controller 160 actuates the first valve 140 fluidly connected to and disposed downstream of the first set of cylinders FS and upstream of the turbocharger 130. The first valve 140 controls a first exhaust flow from the first set of cylinders FS between the turbocharger 130 and the first bypass route L3 through which the first exhaust flow bypasses the turbocharger 130. The first exhaust flow may be defined as a volume of exhaust flow produced by the first set of cylinders FS. In an embodiment, the first valve 140 is moved from the first position at which the exhaust flow from the first exhaust conduit section L2 is directed only to the turbocharger 130 to the second position at which the exhaust flow from the first exhaust conduit section L2 is directed only to bypass the turbocharger 130.

At step 410, the controller 160 actuates the second valve 150 fluidly connected to and disposed downstream of the second set of cylinders SS and upstream of the turbocharger 130. The second valve 150 controls a second exhaust flow from the second set of cylinders SS between the turbocharger 130 and the second bypass route L5 through which the second exhaust flow bypasses the turbocharger 130. The second exhaust flow may be defined as a volume of exhaust flow produced by the second set of cylinders SS. In an embodiment, the second valve 150 moves from the first position at which the exhaust flow from the second exhaust conduit section L4 is directed only to the turbocharger 130 to the second position at which the exhaust flow from the second exhaust conduit section L4 is directed only to bypass the turbocharger 130. In some embodiments, the exhaust flow is always supplied from the primary set of cylinders PS to the turbocharger 130.

The present disclosure provides the control system 100 for controlling the exhaust flow from a variable set (generally a subset) of the cylinders 114 i.e. a combination of the first set of cylinders FS and the second set of cylinders SS to the turbocharger 130. The control system 100 includes the first valve 140 and the second valve 150 to control the exhaust flow from the first set of cylinders FS and the second set of cylinders SS, respectively. Further, the first valve 140 and the second valve 150 may optimize the amount of exhaust flow from the number of cylinders 114 and thus provide a simple, efficient, and demand-based operation of the engine 110. Moreover, provision of the first valve 140 and the second valve 150 to control the exhaust flow supplied to the turbocharger 130 may allow adjustment of the engine performance and characteristics based upon a driving state or a driving mode (such as sports, eco, or other modes) of the vehicle.

The present disclosure provides benefits over conventional turbocharger systems by allowing channeling of exhaust flow from a subset of the cylinders 114 to be supplied to the turbine 132 of the turbocharger 130 through the use of relatively inexpensive valves and associated controls. The number of cylinders 114 having exhaust flow bypassing the turbine 132 may be varied, while minimizing the number of moving binary valves by means of the first valve 140 and the second valve 150. The present disclosure increases efficiency and reduces waste by allowing some of the cylinders 114 to operate at a lower exhaust back pressure based on requirements of the turbocharger 130 and engine parameters. The present disclosure allows the cylinders 114 which are not supplying the exhaust flow to the turbine 132 of the turbocharger 130 to operate at a lower exhaust pressure. This may permit increased efficiency and lower emissions associated during running of the engine 110, among other implementation benefits.

Further, the present disclosure permits reduced costs, complexity, and other limitations associated with wastegates and variable geometry turbine (VGT) nozzles, along with other components of conventional turbocharger systems and engine arrangements.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A control system for an engine, the engine having a turbocharger disposed downstream of a plurality of cylinders producing exhaust flow, the plurality of cylinders including a primary set of cylinders, a first set of cylinders, and a second set of cylinders, the primary set of cylinders being fluidly connected to a primary exhaust conduit section, the first set of cylinders being fluidly connected to a first exhaust conduit section, and the second set of cylinders being fluidly connected to a second exhaust conduit section, the control system comprising:
   an engine sensor configured to generate a signal indicative of an operational characteristic of the engine;

a first valve disposed along the first exhaust conduit section and downstream of the first set of cylinders and upstream of the turbocharger, the first valve configured to control exhaust flow from the first exhaust conduit section between the turbocharger and a first bypass route through which the exhaust flow from the first set of cylinders bypasses the turbocharger;

a second valve disposed along the second exhaust conduit section and downstream of the second set of cylinders and upstream of the turbocharger, the second valve configured to control exhaust flow from the second exhaust conduit section between the turbocharger and a second bypass route through which the exhaust flow from the second set of cylinders bypasses the turbocharger; and a controller communicably coupled to the engine sensor, the first valve, and the second valve, the controller configured to:

receive the signal generated by the engine sensor;
actuate the first valve based on the received signal; and
actuate the second valve based on the received signal;
wherein the first valve and the second valve are actuated to adjust a first amount of exhaust flow received by the turbocharger and a second amount of exhaust flow that bypasses the turbocharger.

2. The control system of claim 1, wherein the first valve is movable between a first position at which exhaust flow from the first exhaust conduit section is directed only to the turbocharger and a second position at which the exhaust flow from the first exhaust conduit section is directed only to bypass the turbocharger.

3. The control system of claim 2, wherein the second valve is movable between a first position at which exhaust flow from the second exhaust conduit section is directed only to the turbocharger and a second position at which exhaust flow from the second exhaust conduit section is directed only to bypass the turbocharger.

4. The control system of claim 3, wherein upon positioning the first valve between the first position and the second position of the first valve, exhaust flow from the first exhaust conduit section is distributed between the turbocharger and to bypass the turbocharger and upon positioning the second valve between the first position and the second position of the second valve, exhaust flow from the second exhaust conduit section is distributed between the turbocharger and to bypass the turbocharger.

5. The control system of claim 1, wherein a number of cylinders included in the first set of cylinders is different than a number of cylinders included in the second set of cylinders.

6. The control system of claim 1, wherein the exhaust flow from the primary set of cylinders is always supplied to the turbocharger.

7. The control system of claim 1, wherein the engine combusts tail gas from a Solid Oxide Fuel Cell (SOFC).

8. The control system of claim 1, wherein the operational characteristic of the engine is selected from one or more of an exhaust flow pressure, an exhaust flow temperature, an exhaust flow rate, an intake flow pressure, an intake flow temperature, an intake flow rate, and an in-cylinder pressure.

9. An engine comprising:

a plurality of cylinders, the plurality of cylinders including a primary set of cylinders, a first set of cylinders, and a second set of cylinders;

a turbocharger disposed downstream of the plurality of cylinders;

an engine sensor configured to generate a signal indicative of an operational characteristic of the engine;

a primary exhaust conduit section fluidly connected to and disposed downstream of the primary set of cylinders, the primary exhaust conduit section being fluidly connected to the turbocharger;

a first exhaust conduit section fluidly connected to and disposed downstream of the first set of cylinders;

a first valve fluidly connected to and downstream of the first exhaust conduit section, the first valve configured to control exhaust flow from the first exhaust conduit section between the turbocharger and a first bypass route through which the exhaust flow from the first set of cylinders bypasses the turbocharger;

a second exhaust conduit section fluidly connected to and downstream of the second exhaust conduit;

a second valve fluidly connected to and disposed downstream of the second exhaust conduit section, the second valve configured to control exhaust flow from the second exhaust conduit section between the turbocharger and a second bypass route through which the exhaust flow from the second set of cylinders bypasses the turbocharger; and a controller communicably coupled to the engine sensor, the first valve and the second valve, the controller configured to:

receive the signal generated by the engine sensor;
actuate the first valve based on the received signal; and
actuate the second valve based on the received signal;
wherein the first valve and the second valve are actuated to adjust a first amount of exhaust flow received by the turbocharger and a second amount of exhaust flow that bypasses the turbocharger.

10. The engine of claim 9, wherein the first valve is movable between a first position at which exhaust flow from the first exhaust conduit section is directed only to the turbocharger and a second position at which the exhaust flow from the first exhaust conduit section is directed only to bypass the turbocharger.

11. The engine of claim 10, wherein the second valve is movable between a first position at which exhaust flow from the second exhaust conduit section is directed only to the turbocharger and a second position at which exhaust flow from the second exhaust conduit section is directed only to bypass the turbocharger.

12. The engine of claim 11, wherein upon positioning the first valve between the first position and the second position of the first valve, exhaust flow from the first exhaust conduit section is distributed between the turbocharger and to bypass the turbocharger and upon positioning the second valve between the first position and the second position of the second valve, exhaust flow from the second exhaust conduit section is distributed between the turbocharger and to bypass the turbocharger.

13. The engine of claim 9, wherein a number of cylinders included in the first set of cylinders is different than a number of cylinders included in the second set of cylinders.

14. The engine of claim 9, wherein the exhaust flow from the primary set of cylinders is always supplied to the turbocharger.

15. The engine of claim 9, wherein the engine combusts tail gas from a Solid Oxide Fuel Cell (SOFC).

16. The engine of claim 9, wherein the operational characteristic of the engine is selected from one or more of an exhaust flow pressure, an exhaust flow temperature, an exhaust flow rate, an intake flow pressure, an intake flow temperature, an intake flow rate, and an in-cylinder pressure.

17. A method of controlling an engine, the engine having a turbocharger disposed downstream of a plurality of cylinders producing exhaust flow, the plurality of cylinders including a primary set of cylinders, a first set of cylinders, and a second set of cylinders, the method comprising:

operating the plurality of cylinders to generate exhaust flow;

operating the turbocharger with a primary exhaust flow from the primary set of cylinders;

receiving, by a controller, a signal indicative of an operational characteristic of the engine generated by an engine sensor;

actuating, by the controller, a first valve fluidly connected to and disposed downstream of the first set of cylinders and upstream of the turbocharger based on the received signal, wherein the first valve is configured to control a first exhaust flow from the first set of cylinders between the turbocharger and a first bypass route through which the first exhaust flow bypasses the turbocharger; and actuating, by the controller, a second valve fluidly connected to and disposed downstream of the second set of cylinders and upstream of the turbocharger based on the received signal, wherein the second valve is configured to control a second exhaust flow from the second set of cylinders between the turbocharger and a second bypass route through which the second exhaust flow bypasses the turbocharger.

18. The method of claim 17, further including moving the first valve from a first position at which exhaust flow from the first exhaust conduit section is directed only to the turbocharger to a second position at which the exhaust flow from the first exhaust conduit section is directed only to bypass the turbocharger.

19. The method of claim 18, further including moving the second valve from a first position at which exhaust flow from the second exhaust conduit section is directed only to the turbocharger to a second position at which the exhaust flow from the second exhaust conduit section is directed only to bypass the turbocharger.

20. The method of claim 17 further including always supplying exhaust flow from the primary set of cylinders to the turbocharger.

* * * * *

UNITED STATES PATENT AND TRADEMARK OFFICE
CERTIFICATE OF CORRECTION

PATENT NO. : 11,193,435 B1
APPLICATION NO. : 16/874931
DATED : December 7, 2021
INVENTOR(S) : Christopher Lusardi Page 1 of 1

It is certified that error appears in the above-identified patent and that said Letters Patent is hereby corrected as shown below:

In the Specification

Insert the following two new paragraphs immediately after the title at Column 1:
--Statement of Government Interest
This invention was made with government support under contract DE-AR0000953 / 850K474(Sub) awarded by the DOE. The Government has certain rights in this invention.--

Signed and Sealed this
Eighth Day of November, 2022

Katherine Kelly Vidal
*Director of the United States Patent and Trademark Office*